March 7, 1939. A. V. SÖDERSTRÖM 2,150,135
SNOW CHAIN AND RUNNER OR SKI FOR MOTOR VEHICLES
Filed Jan. 25, 1937  3 Sheets-Sheet 2
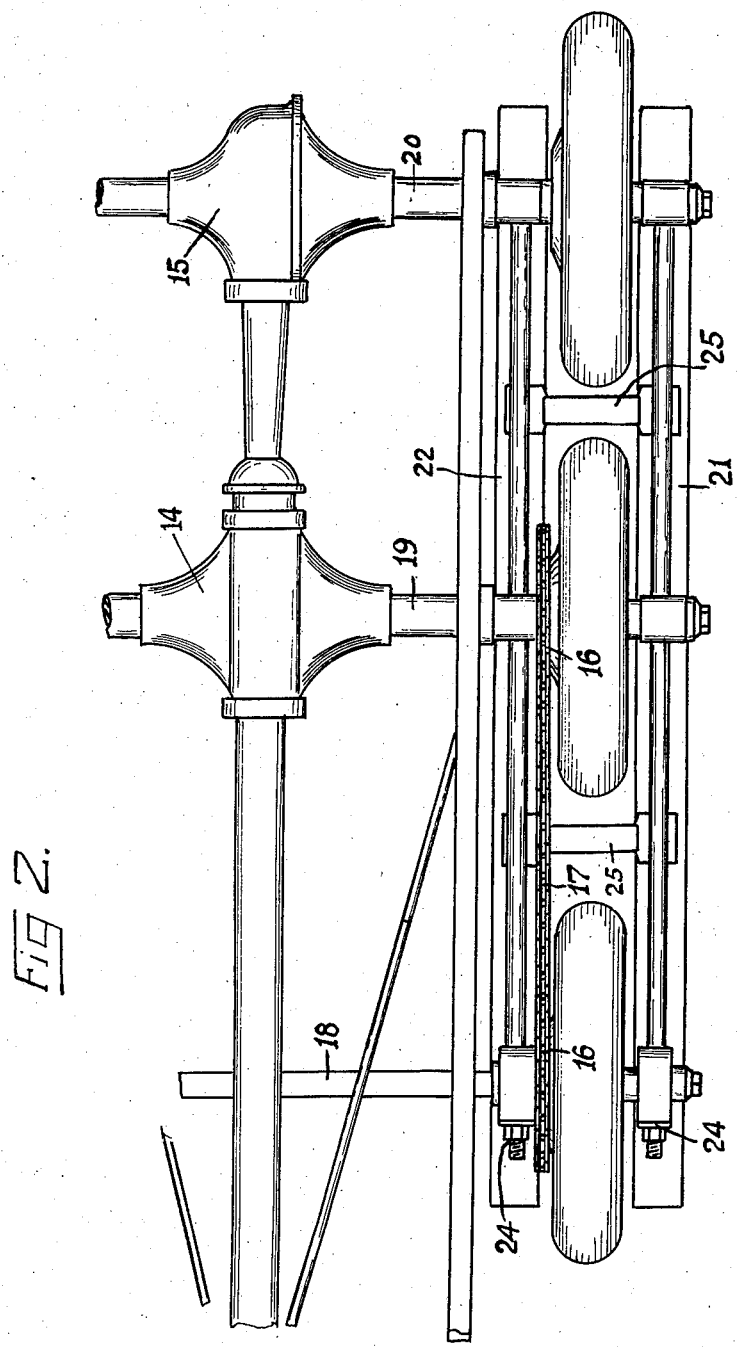

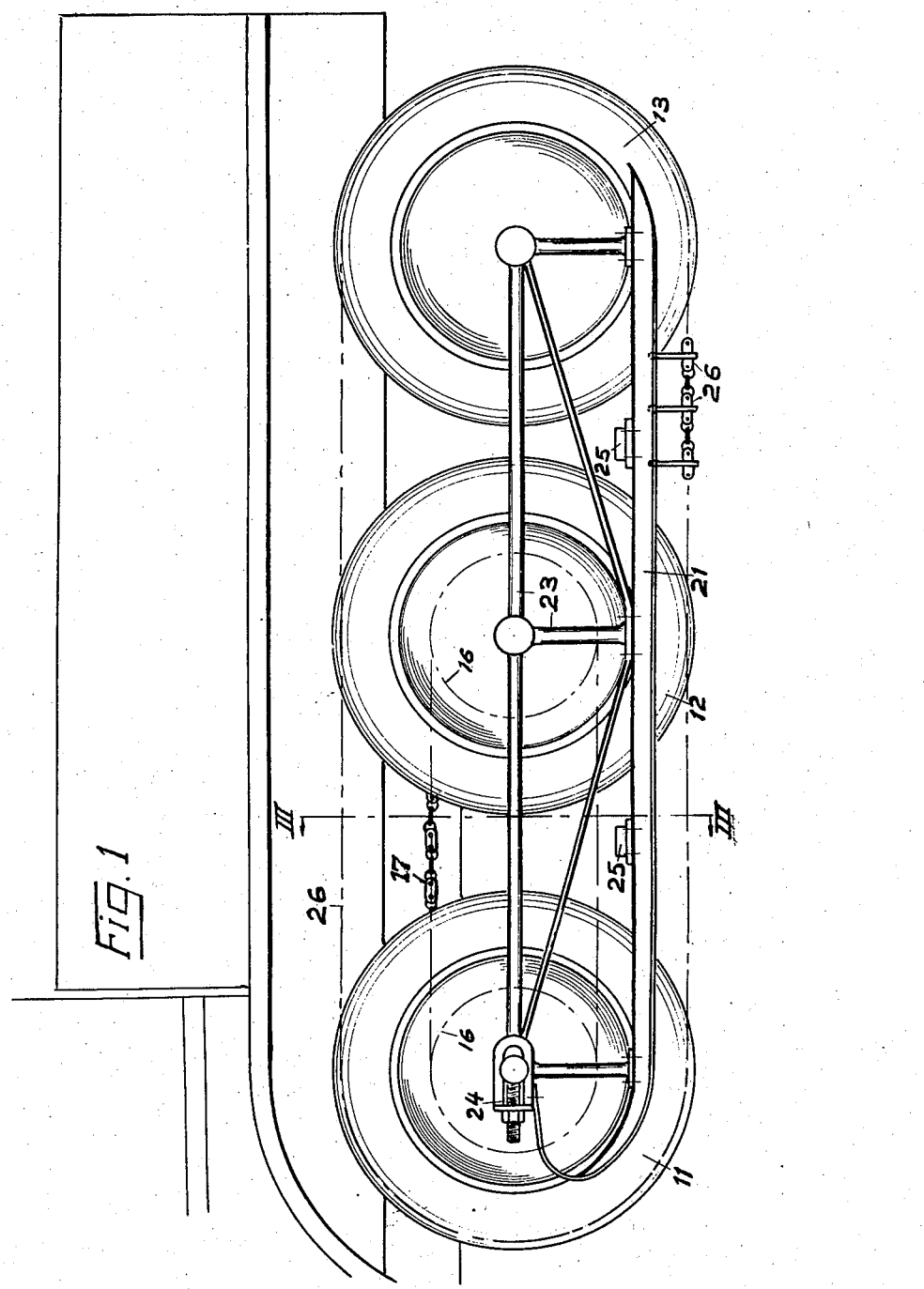

March 7, 1939.  A. V. SÖDERSTRÖM  2,150,135
SNOW CHAIN AND RUNNER OR SKI FOR MOTOR VEHICLES
Filed Jan. 25, 1937  3 Sheets-Sheet 3
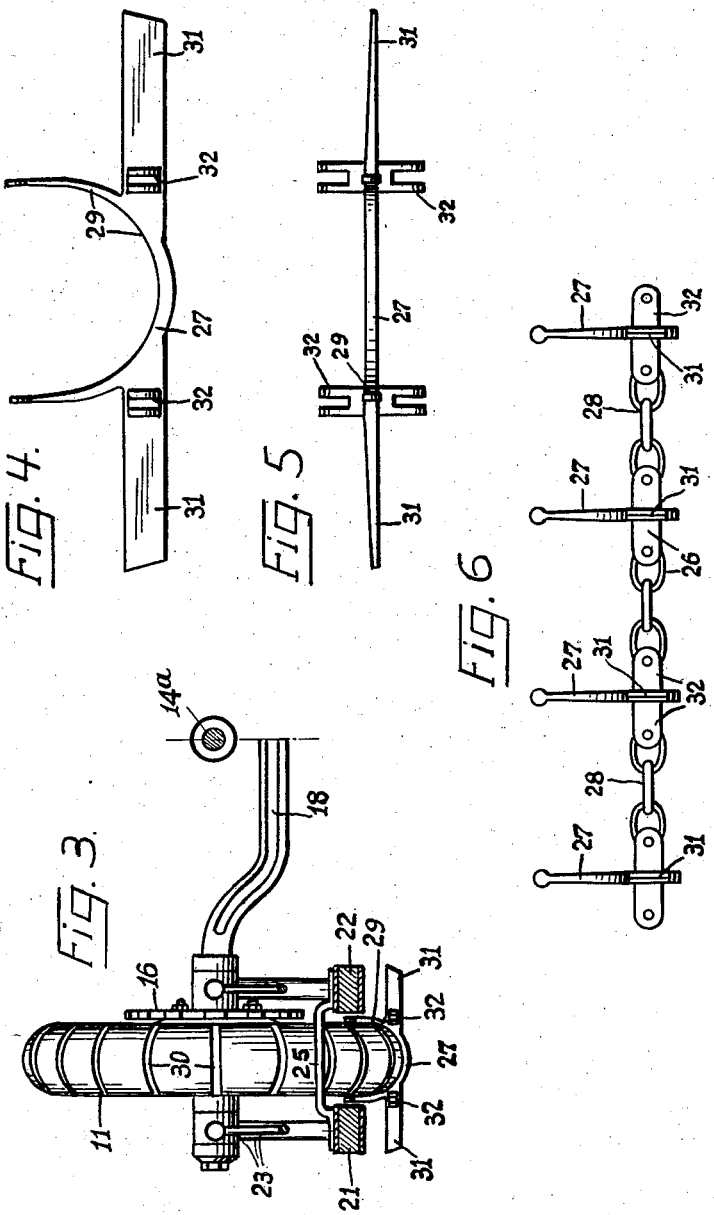
A. V. Söderström,
By William E. P. Bayly
Attorney.

Patented Mar. 7, 1939

2,150,135

UNITED STATES PATENT OFFICE 2,150,135

SNOW CHAIN AND RUNNER OR SKI FOR MOTOR VEHICLES

Anders Verner Söderström, Rovaniemi, Finland

Application January 25, 1937, Serial No. 122,233
In Finland February 6, 1936

1 Claim. (Cl. 180—5)

This invention relates to improvements in snow-chains and runners or skis for motor vehicles, especially for automobiles, by the aid of which the vehicle will be able to rise up on snow-drifts or pass over the same and along paths covered by soft snow. By the use of hitherto known devices it was not possible to drive vehicles on unplowed paths covered by a relatively thick layer of snow. The vehicle could not rise on the top of a soft layer of snow, but was sunk down into the snow.

By using the device according to this invention it will be possible to drive a vehicle on practically any snow covered land provided that the land is sufficiently even to prevent the vehicle from being tilted and that tree stubs or stones covered by the snow are not so high that they could reach the shafts of the vehicle.

Hitherto runners have been arranged along the sides of the wheels or the front wheels have been replaced by runners or skis. These devices have, however, proved inoperative in soft and thick snow inasmuch as the rear wheels do not find sufficient friction in the soft snow to enable them to drive the vehicle forward.

According to this invention several sets of rear wheels are provided and alongside of the same runners or skis are arranged, while a snow chain passing around the wheels partly runs below the runners or skis. The snow is compressed by the weight of the vehicle and thus compressed offers sufficient support for the snow chain to render the latter operative. If skis are combined also with the front wheels, the snow will be partly compressed before the rear skis reach the same. The wheels are slightly deeper than the skis so that the vehicle will thus run on hard ground by the aid of its wheels only.

The accompanying drawings illustrate by way of example the idea of this invention.

Fig. 1 illustrates the rear wheels of an automobile in a side view and

Fig. 2 illustrates a plan view of the same, the automobile body being removed.

Fig. 3 is a sectional view along line III—III of Fig. 1.

Fig. 4 illustrates in a side view the pulling member of the snow chain while

Fig. 5 is a plan view of the latter.

Fig. 6 is a side view of a portion of the snow chain showing how the pulling members are joined and attached to a chain.

In the illustrated arrangement there are three pairs of rear wheels 11, 12, 13. The number of rear wheels may, of course be larger or smaller according to the weight of the vehicle and the softness of the snow, all within the scope of this invention. In the illustrated embodiment all three pairs of wheels are driven. The rearmost wheels are driven by the Cardan gears within housings 14, 15, integral with casing 14a and the foremost ones are driven by chain wheels and chain 16, 17 from the middle shaft 19.

On both sides of the wheels runners or skis 21, 22 are provided and attached to rigid frames 23. The shafts of the wheels are journalled in these frames and for the foremost wheels a spanner 24 attached to the frame enables stretching of the chain 17. A supporting spring (not shown) attached to the middle shaft 19 supports the automobile body. Thus the wheels and the skis will run along the surface of the ground, rising and falling according to any elevations and cavities in the same. The skis are joined to one another by the aid of bars 25.

A joint pulling chain 26 runs all round the rear wheels, said chain being composed of pulling members 27 and chains 28. The pulling members are formed by a semicircular central arc 29 adapted to the wheel tire. In the surface of the tires transversal grooves 30 are made, some of which are shown in Fig. 3, and into which the central arcs 29 of the pulling members 27 are adapted to be placed. From said central arc pulling fingers or wings 31 extend sideways and these are by chains 28 interattached to forked lugs 32 fixed at right angles to the inner ends of the respective wings 31 as shown in Figs. 4 and 5.

Fig. 3 shows that the pulling wings 31 of the chain reach below the skis 21, 22. The runners or skis attached along the sides of the front wheels or replacing the latter compress partly the snow. When the rear runners or skis reach this already partly compressed snow the same is further compressed by the weight of the vehicle and the fingers of the chains will meet sufficient resistance so that the rear wheels will not revolve loosely but will find sufficient friction to drive the vehicle.

Having now particularly described and ascertained this my invention and in what manner the same is to be performed, I hereby declare that what I claim is:

In combination with an automobile frame, at least two wheel shafts arranged side by side in said frame, a wheel with transverse grooves on its periphery mounted upon the ends of the respective shafts, a plurality of members provided with a semi-circular central portion and lateral wings extending from said central portion and means for linking said members together into an endless tractive snow chain, a frame depending from the wheel shafts on each side of the wheels, a ski fixed to each frame above the level of the snow chain, the arrangement being such that the lateral wings project out at right angles from the snow chain on both sides of each wheel and the skis ride over the surface of a snow covered ground compressing the snow thereunder.

ANDERS VERNER SÖDERSTRÖM.